United States Patent [19]
Yao et al.

[11] Patent Number: 6,066,359
[45] Date of Patent: May 23, 2000

[54] PROCESS FOR PRODUCING TITANIUM OXIDE THIN FILM, AND PHOTOCATALYST

[75] Inventors: Takeshi Yao, 28-12, Kozu 2-chome, Katano-shi, Osaka 576; Koji Sato; Hisayoshi Toratani, both of Tokyo, all of Japan

[73] Assignees: Takeshi Yao, Katano; Hoya Corporation, Tokyo, both of Japan

[21] Appl. No.: 09/068,659

[22] PCT Filed: Sep. 8, 1997

[86] PCT No.: PCT/JP97/03155

§ 371 Date: May 12, 1998

§ 102(e) Date: May 12, 1998

[87] PCT Pub. No.: WO98/11020

PCT Pub. Date: Mar. 19, 1998

[30] Foreign Application Priority Data

Sep. 13, 1996 [JP] Japan ................................. 8-243770

[51] Int. Cl.[7] ................................ B05D 5/00; B01J 23/00
[52] U.S. Cl. ................................ 427/126.3; 427/443.1; 427/443.2; 502/349; 502/350; 423/610
[58] Field of Search ............................. 427/126.3, 443.1, 427/443.2; 502/350, 349; 423/610

[56] References Cited

U.S. PATENT DOCUMENTS

| | | | |
|---|---|---|---|
| 4,359,449 | 11/1982 | Hard et al. ........................... 423/82 |
| 4,497,779 | 2/1985 | Kramer et al. ........................ 423/72 |
| 4,954,465 | 9/1990 | Kawashima et al. ................... 502/5 |
| 5,173,386 | 12/1992 | Murasawa ............................. 430/84 |
| 5,256,616 | 10/1993 | Heller et al. ........................ 502/350 |
| 5,811,192 | 9/1998 | Takahama et al. .................... 428/432 |
| 5,824,278 | 10/1998 | Yao . |
| 5,830,242 | 11/1998 | Yao . |

FOREIGN PATENT DOCUMENTS

| | | |
|---|---|---|
| 59-141441 | 8/1984 | Japan . |
| 1-93443 | 4/1989 | Japan . |
| 3-285822 | 12/1991 | Japan . |
| 4-26516 | 1/1992 | Japan . |
| 4-132636 | 5/1992 | Japan . |
| 9-249418 | 9/1997 | Japan . |

*Primary Examiner*—Shrive Beck
*Assistant Examiner*—Michael Barr
*Attorney, Agent, or Firm*—Frishauf, Holtz, Goodman, Langer & Chick, P.C.

[57] ABSTRACT

The present invention relates to a process for producing a titanium oxide thin film, said process comprises soaking a substrate in an aqueous solution containing $10^{-9}$ to $9 \times 10^{-2}$ mol/L of a titanium fluoro complex compound in the presence of a fluoride ion capturing agent to form a titanium oxide thin film on the surface of the substrate; and a photocatalyst comprising the titanium oxide thin film thus produced; and can provide a simple process for the formation of a highly homogeneous titanium oxide thin film which is fast and corrosion resistant, and has a high refractive index and a catalytic activity for the photoreaction.

70 Claims, 2 Drawing Sheets

PROCESS FOR PRODUCING TITANIUM OXIDE THIN FILM, AND PHOTOCATALYST

TECHNICAL FIELD

The present invention relates to a process for forming a titanium oxide thin film on the surface of a substrate and more specifically to a process for forming a titanium oxide thin film using the liquid phase precipitation process. The present invention also relates to a photocatalyst comprising a titanium oxide thin film thus produced.

BACKGROUND ART

Titanium oxide produces an OH radical having a large energy corresponding to 120 kcal/mol by irradiation of light. This energy is larger than the bond energy of a C—C bond, a C—H bond, a C—N bond, a C—O bond, an O—H bond, or an N—H bond of organic compounds and thus the energy can easily decompose these bonds. Because of this action, titanium oxide can easily decompose organic compounds, and therefore it has been used as a catalyst of photodecomposition reactions to decompose a variety of organic substances including the decomposition, sterilization etc. of harmful substances or bad-smelling substances dissolved in water or suspended in the air, thereby finding practical applications in environmental clarification, epidemics control, and the like.

Such a utilization of titanium oxides as a catalyst can be effectively carried out by forming titanium oxide thin films on the surface of a substrate including ceramics such as glass and tiles or inorganic fibers. On the other hand, by utilizing properties that the titanium oxide thin films have high refractive indices and are chemically stable, titanium oxide thin films formed on the surface of light-transmitting substances such as glass have been used for optical applications such as coating of optical lenses and for heat radiation reflexive glasses, and are expected to be a solar cell which makes possible low-cost solar power generation.

As the processes for forming a titanium oxide thin film on the surface of a substrate, there are mentioned CVD, ion plating, sputtering, and the like. In these processes, however, special and expensive equipment is required, and the formation of a thin film on the substrate having a large surface area and the formation of a homogeneous thin film on the surface of a substrate having a complicated shape are difficult.

Furthermore, there are a process for forming titanium oxide thin films by spraying onto the surface of a substrate a solution in which a titanium alkoxide such as tetraethyl titanate, tetra-n-propyl titanate, tetraisopropyl titanate, or tetra-n-butyl titanate; or a titanium chelate compound such as titanium acetyl acetonate is dissolved in an organic solvent, or by soaking a substrate in said solution, removing the solvent and then by oxidizing at a high temperature, or a process for exposing the substrate to the vapor of titanium tetrachloride. However, in addition to being complicated, these processes require dealing with hydrolytic substances and so it is impossible to form a uniform thin film on the substrate having a large surface area or the substrate having a complicated shape.

Another process for forming titanium oxide thin films on the surface of a substrate involves spreading a mixture obtained by kneading finely powdered titanium oxide with a binder and a dispersant on the surface of a substrate followed by drying thereof. However, in such a process, it is difficult to form a sufficiently thin and uniform as well as a strong thin film. Furthermore, due to the photocatalytic activity possessed by titanium oxide, the binder which is an organic substance is decomposed, and therefore adhesiveness onto the substrate cannot permanently continue.

In Japanese Unexamined Patent Publication No. 59-141441 and Japanese Unexamined Patent Publication No. 1-93443, processes for forming a titanium oxide-coated layer on the surface of the substrate by soaking a substrate in an aqueous solution containing fluorotitanate in the presence of a fluoride ion-capturing agent such as boric acid have been disclosed. In the former, zinc oxide is saturated in said aqueous solution so that there is a problem of causing variation in refractive index due to introduction of Zn atom into the coated layer. The concentration of fluorotitanic acid is 0.3 to 1.0 mol/L in the former and 0.1 to 3 mol/L in the latter, and a fluorotitanic acid solution of 0.5 to 3.4 mol/L has been used in the Example therein. When such a high concentration of fluorotitanic acid is used, the solution becomes turbid with the addition of a fluoride ion-capturing agent since a large quantity of titanium oxide precipitates in the solution, which prevents formation of a thin film on the surface of the substrate without wasting the materials. Furthermore, the formed thin film is ununiform and the surface condition thereof is bad so that it is not suitable for optical applications in which its transmittance to light and its uniformity are required and for photoreactive catalysts or solar cells.

Thus, an object of the present invention is to provide a process for forming a titanium oxide thin film excellent in uniformity on the surface of a substrate by means of simple equipment by overcoming the abovementioned problems associated with the conventional processes. Another object of the present invention is to provide a catalyst for photodecomposition reaction, said catalyst comprising a titanium oxide thin film formed on the surface of the substrate.

SUMMARY OF THE INVENTION

The present inventors have conducted intensive studies to attain the above-mentioned objects, and as the results, they have found that said objects can be attained by limiting the concentration of the titanium fluoro complex compound in the aqueous solution used to precipitate the titanium oxide thin film to a dilute range of $10^{-9}$ to $9\times10^{-2}$ mol/L and thereby have arrived at the present invention.

Thus, the process of producing a titanium oxide thin film of the present invention comprises soaking a substrate in an aqueous solution containing $10^{-9}$ to $9\times10^{-2}$ mol/L of one kind or two or more kinds of titanium fluoro complex compound in the presence of a fluoride ion-capturing agent to form a titanium oxide thin film on the surface of a substrate. The catalyst of the present invention also comprises the titanium oxide thin film formed on the surface of the substrate by the above-mentioned producing process, and is used in the photodecomposition reaction of organic compounds and nitrogen oxides, e.g., a trace amount of organic compounds.

BEST MODE FOR PRACTICING THE INVENTION

Figure 1:
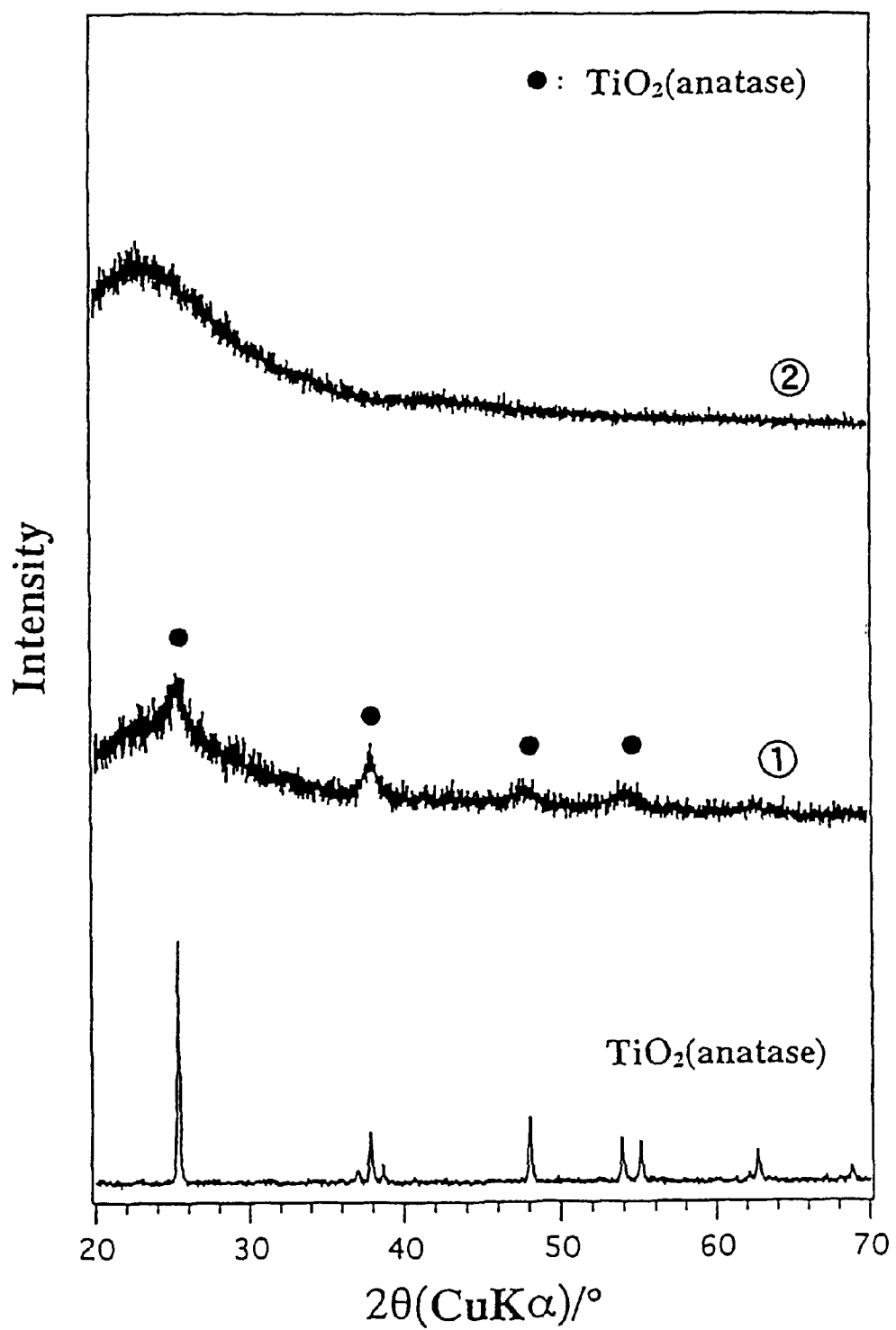
FIG. 1 is an X-ray diffraction pattern of the titanium oxide film obtained in Example 4.

In the present invention, the titanium fluoro complex compound used for the formation of a titanium oxide thin film is a water-soluble acid or a salt which is represented by the general formula (I):

$$A_aTi_bF_c \qquad (I)$$

wherein A's may be the same or different from each other and each represent a hydrogen atom, an alkali metal atom, an ammonium group or coordinated water; and, a, b and c are each a number of making said complex compound electrically neutral.

As A, there are mentioned a hydrogen atom; an alkali metal atom such as lithium, sodium, potassium, rubidium, and cesium; and an ammonium group and coordinated water. In the above formula, when b is 1, a is usually 2, c is usually 6. That is, while said complex compound is typically represented by $A_2TiF_6$, a polynuclear complex compound having a plural number of Ti atoms can be obtained. As the titanium fluoro complex compounds represented by the general formula (I), there are exemplified by $H_2TiF_6$, $(NH_4)_2TiF_6$, $Na_2TiF_6$, $K_2TiF_6$, $Rb_2TiF_6$, $Cs_2TiF_6$, and the like.

The titanium fluoro complex compound to be used in the present invention may be any material which is produced by any process. For example, powdered titanium oxide may be treated with hydrofluoric acid to make fluorotitanic acid. As the titanium oxide, any of the rutile structure, the anatase structure, the brookite structure, and amorphous may be used.

Alternatively, a hydroxide or an oxyhydroxide of titanium may be dissolved in an aqueous solution of an alkali metal hydrogen difluoride such as ammonium hydrogen difluoride or sodium hydrogen difluoride to synthesize a titanium fluoro complex compound, and it may be used in the process for production of the present invention.

The titanium fluoro complex compounds may be used as aqueous solutions in the concentration of $10^{-9}$ to $9\times10^{-2}$ mol/L, preferably $10^{-6}$ to $6\times10^{-2}$ mol/L, and more preferably $10^{-2}$ to $4\times10^{-2}$ mol/L. For example, 0.001 to 20 g or so of a titanium oxide is dissolved in 400 ml of a 0.001 to 0.6 mol/L hydrofluoric acid aqueous solution to obtain an aqueous solution containing titanium fluoro complex ions of $10^{-9}$ to $9\times10^{-2}$ mol/L. When the concentration is less than $10^{-9}$ mol/L, a thin film cannot be formed on the surface of the substrate, while if an aqueous solution exceeding $9\times10^{-2}$ mol/L is used, the solution becomes turbid with the addition of a fluoride ion-capturing agent or the solution thereof, whereby a uniform titanium oxide thin film cannot be formed on the surface of the substrate. The "aqueous solution" herein mentioned may be an aqueous solution containing an excess of hydrogen fluoride which is used to synthesize the above complex compound from the titanium oxide described above. Also, an excessive amount of titanium oxide is further added to the prepared titanium fluoro complex compound aqueous solution (hereinafter as defined above) to prepare a saturated solution of the above-mentioned complex compound, then, titanium oxide which is not dissolved is removed by filtration and the resulting aqueous solution may be used. Incidentally, in the present invention, an aqueous solution includes those which contain an organic solvent soluble in water, and as long as it comprises water as a main component, it is not prevented from existing, for example, an alcohol such as methanol, ethanol, etc.; an ether such as dimethyl ether, diethyl ether, etc.; a ketone such as acetone, etc.; and other organic solvent soluble in water.

Furthermore, a seed crystal(s) for producing a titanium oxide thin film may be added to an aqueous solution of such a titanium fluoro complex compound. The seed crystal(s) to be used is preferably a crystal of the desired titanium oxide. The average particle size of the seed crystal may be as small as 0.001 to 10 μm, and the amount added may be, though not limited, a minute amount. With the addition of the seed crystal(s), the precipitate formation rate of the crystalline titanium oxide thin film can be enhanced.

The fluoride ion-capturing agent to be used in the present invention includes a homogeneous type which is used by being dissolved in a liquid phase and a heterogeneous type which is a solid material. Depending on the purposes, one of them may be used, or both of them may be used in combination.

The homogeneous type fluoride ion-capturing agent reacts with a fluoride ion to form a stable fluoro complex compound and/or a stable fluoride, thereby shifting the equilibrium of the hydrolysis reaction so as to precipitate a titanium oxide thin film on the surface of a substrate. Examples thereof may include in addition to boron compounds such as orthoboric acid, metaboric acid, boron oxide, etc.; aluminum chloride, sodium hydroxide, aqueous ammonia and the like. For example, when $TiO_2$ is to be precipitated from $H_aTi_bF_c$ (wherein a to c are as defined above) by using orthoboric acid, and, for example, when $H_2TiF_6$ is mentioned as an example, the reaction represented by the formula (III) is shifted in the direction of consuming $F^-$ so that the equilibrium represented by the formula (II) is shifted in the direction of forming $F^-$, and as the results, a thin film comprising $TiO_2$ is precipitated. Such a capturing agent is generally used in the form of an aqueous solution, but it may be added in the form of a powder, which is then dissolved in the system. Addition of said capturing agent may be carried out at one time or intermittently in several divided amounts, or it may be carried out continuously at a controlled supplying rate, for example, at a constant rate.

$$TiF_6^{2-}+2H_2O \rightleftharpoons TiO_2+6F^-+4H^+ \qquad (II)$$

$$BO_3^{3-}+4F^-+6H^+ \rightarrow BF_4^-+3H_2O \qquad (III)$$

The heterogeneous type fluoride ion-capturing agent may be exemplified by a metal such as aluminum, titanium, iron, nickel, magnesium, copper, zinc, germanium, etc.; ceramics such as glass; silicon; a boron compound such as orthoboric acid, metaboric acid, boron oxide, etc.; and a compound such as calcium oxide, aluminum oxide, silicon dioxide, magnesium oxide, etc. When such a solid material is added or inserted into an aqueous solution, $F^-$ in the vicinity of the solid material is consumed to cause a decrease in its concentration, with a result that the chemical equilibrium in the region is shifted to precipitate titanium oxide. When such a solid material is used, depending on the process of insertion and the reaction condition, the titanium oxide thin film can be precipitated on the entire surface of the substrate soaked in the aqueous solution, or precipitation can be limited to a selected local portion, i.e., the vicinity where said solid material exists. Whereas the main object of the present invention is to obtain a uniform titanium oxide thin film, depending on the objects, a precipitated thin film on the surface of the substrate can be thickened partially by using the homogeneous- and heterogeneous-type fluoride ion-capturing agents in combination.

The amount of the homogeneous-type fluoride ion-capturing agent may vary depending on the kind and shape of the precipitates, but it is generally in the range of $10^{-4}$ to 3,000% and preferably $10^{-1}$ to 1,000% based on the amount corresponding to the equivalent amount of fluoride ions in the solution. The heterogeneous type fluoride ion-capturing agent is not particularly limited and is preferably used in an amount in which the objects and effects of the present invention are accomplished.

As the substrate, there may be used a wide range of substances which carries titanium oxide thin film to be formed, or which is coated for the specific objects by the formed said thin film, or for being protected from oxidation, etc. Such a substance may be exemplified by a metal, ceramics, an organic polymer material, etc.

Especially, when the titanium oxide thin film is used as a catalyst for the photodecomposition reaction, as a solar energy-absorbing layer of a solar cell, or as a coating layer for an optical purpose, a substance having high transparency such as glass, a polycarbonate, an acrylic resin, etc. is used as the substrate. When glass is used as the substrate, the kind is not limited. Particularly, even when a film is formed on an alkali-containing glass such as soda lime glass, there is a little or no fear of deteriorating the film by dissolving the alkali component into the film since the film is formed at a relatively low temperature in the process of the present invention.

The timing of soaking the substrate in the aqueous solution of the titanium fluoro complex compound may be before, simultaneously with, or after addition or insertion of the fluoride capturing agent. However, when a substrate which may be corroded by the system is used, it is necessary to pay attention to the composition of the solution, the reaction conditions and the timing of soaking. The substrate may be of any shape, is not restricted to the plate form, and those of complicated shapes may be used. Also, in order to enhance uniformity of the film, for example, the substrate may be slowly rotated at a rotating rate of 10 rpm or less, preferably 5 rpm or less.

The reaction temperature affects precipitation of the film so that it is usually set in the range of 10 to 80° C., preferably 20 to 50° C., and more preferably 35 to 40° C. The reaction time is also optional, and, for example, when the desired precipitation is a much amount, the reaction time is elongated depending thereon. For example, in order to precipitate a film having a thickness of about 0.2 $\mu$m, the reaction time is preferably 1.5 to 24 hours, and more preferably 3 to 10 hours. When the reaction time is shorter than the above, the film is not precipitated sufficiently, while when it is longer than the above, there is a fear that the film may peel off.

Thus, a uniform and fast titanium oxide thin film can be formed on the surface of the substrate. The thin film thus formed is obtained as a crystallized titanium oxide thin film without undergoing the heating process such as firing by optionally setting the precipitation conditions, but the heating process may be included depending on the purpose. The heating process may be conducted, for example, at 200 to 600° C. for about 0.5 to 5 hours. The titanium oxide thin film thus formed on the surface of the substrate has a thickness of 0.1 to 5.0 $\mu$m and a pencil hardness of 6 H to 7 H or more.

Industrial Applicability

In accordance with the present invention, a titanium oxide thin film can be easily formed on the surface of a substrate, particularly on the surface of the substrate having a large area or a complicated shape. The thin film thus obtained does not have any strain caused by a cooling process since it does not necessarily require a heating process to crystallize the thin film.

The titanium oxide thin films obtained in accordance with the present invention are fast and corrosion-resistant, and have a high refractive index, and a catalytic activity to the photoreaction. Utilizing these various properties, they are extremely useful as a photocatalyst for decomposition of an organic compound or a nitrogen oxide; as a solar cell; and for optical purposes such as coating of optical lenses, etc. When it is used as a catalyst for the photodecomposition reaction, a heating process is not particularly required so that the subject of a material of the substrate is a wide range whereby it can be easily employed in-place application such as a purification system for household use and the waste water treatment at plants, etc.

EXAMPLES

In the following, the pre sent invention is explained in more details by referring to Examples. The present invention is not limited by these Examples.

Example 1

To 500 ml of purified water were added 2 ml of 46% hydrofluoric acid and 7 g of the rutile structure titanium oxide powder, and the mixture was then dissolved while stirring at 35° C. for 24 hours. The powder of titanium oxide remained without dissolution was removed by filtration using a filter having pores sized 11 $\mu$m. The concentration of the fluorotitanic acid solution obtained was $10^{-3}$ mol/L and a minute amount of titanium oxide sized a several $\mu$gm that passed through the filter was present as seed crystals. A glass substrate that had been previously washed with acetone was soaked in the solution at a temperature of 35° C., and each 5 g of orthoboric acid was added for 6 times with an interval of one hour. When the obtained mixture was allowed to stand for further 6 hours, a uniform and transparent thin film having no interference color was formed on the surface of the substrate while the liquid remained transparent.

The substrate was picked up from the liquid, washed with water and dried. The thin film on the substrate was dense and fast, and no scratch was observed. When the film was subjected to the energy dispersive X-ray analysis (EDX), it was observed that the crystals containing Ti were formed, thereby confirming that the thin film was titanium oxide.

Example 2

In the similar manner as in Example 1 except for using 5 g of the rutile structure titanium oxide powder, a fluorotitanic acid solution with a concentration of $4 \times 10^{-4}$ mol/L and containing a minute amount of seed crystals was obtained. To the solution was added each 2 g of orthoboric acid for 5 times with an interval of one hour. After allowing the obtained mixture to stand for 12 hours, the orthoboric acid was added in the similar manner for 6 more times and the mixture was allowed to stand for 3 days, a uniform and fast thin film was formed on the surface of the substrate. In the similar manner as in Example 1, it was confirmed that the thin film was titanium oxide.

Example 3

In the similar manner as in Example 1 except for changing the added amount of 46% hydrofluoric acid solution to 1 ml, a fluorotitanic acid solution with a concentration of $10^{-4}$ mol/L and containing a minute amount of seed crystals was obtained. To the solution was added each 5 g of orthoboric acid for 2 times with an interval of two hours. When the mixture was allowed to stand for 5 days, a uniform and fast thin film was formed on the surface of the substrate. In the similar manner as in Example 1, it was confirmed that the thin film was titanium oxide.

Example 4

0.933 g of $(NH_4)_2TiF_6$ was added to 400 ml of purified water, and was dissolved by stirring at 30° C. for 24 hours to obtain an aqueous solution of $(NH_4)_2TiF_6$ with a concentration of $1.179 \times 10^{-2}$ mol/L. Each 30 ml portion of this solution was taken in two polystyrene containers. Each glass plate which had been previously subjected to ultrasonic washing in ethanol was soaked in each container as a substrate, and 1.06 ml (1 equivalent) or 2.12 ml (2 equivalents) of an orthoboric acid aqueous solution with a concentration of 0.5 mol/L was added thereto, respectively, and the mixture was maintained at 30° C. for 6 days.

The substrates were taken out from the mixture, washed with distilled water and air dried, and then observed by the scanning electron microscope (SEM). As a result, the formation of a dense thin film was observed. When the film was subjected to EDX, it was confirmed that crystals each containing Ti had been precipitated. Furthermore, as the result of the X-ray diffraction (XRD), an XRD peak corresponding to the XRD peak of the anatase structure $TiO_2$ type powder was observed, thereby it could be confirmed that a thin film containing the anatase structure $TiO_2$ crystals had been formed. The result is shown as ① in FIG. 1. However, the sample in which an added amount of orthoboric acid is 1 equivalent was not sharp in the peak of XRD pattern, so that it is thought that a thin film in which the amorphous $TiO_2$ and the anatase structure $TiO_2$ are mixed was formed. The result is shown as ② in FIG. 1.

Example 5

1.75 g of $(NH_4)_2TiF_6$ was added to 700 ml of purified water, and was dissolved by stirring at 30° C. for 24 hours to obtain an aqueous solution of $(NH_4)_2TiF_6$ with a concentration of $1.263 \times 10^{-2}$ mol/L. To the solution was added 17.5 g of the rutile structure $TiO_2$ powder, and the mixture was further stirred for 24 hours. Then, the powder $TiO_2$ remained without dissolution was separated by filtration by using a filter paper having pores sized 1 μm and the $TiO_2$ fine particles passed through the filter paper were used as the seed crystals. Each 30 ml portion of this mixture was taken in 4 polystyrene containers. In each container was soaked as a substrate a glass plate that had been previously subjected to ultrasonic washing in ethanol. And an orthoboric acid aqueous solution with a concentration of 0.5 mol/L was added in an amount of each 1.14 ml (1 equivalent) to the two mixtures and each 22.8 ml (2 equivalents) to the rest two mixtures. The containers were then maintained at 30° C. for 3 days or 6 days.

The substrates thus obtained were analyzed by SEM, EDX and XRD in the similar manner as in Example 4. As the results, it could be confirmed that the longer the soaking period and the more the amount of orthoboric acid added, the more precipitated amount is obtained, and that a dense $TiO_2$ thin film was formed on the surface of the substrate that had been soaked for 6 days after adding 2 equivalents of orthoboric acid. For the substrate soaked for 6 days the formation of the $TiO_2$ crystals was observed in a similar tendency to that in Example 4, and the crystals of the thin film obtained was the anatase structure even though the seed crystals were the rutile structure.

Example 6

An experiment was conducted similar to that in Example 5 except for making the seed crystal the anatase structure $TiO_2$. As the results, in the similar manner as in Examples 4 and 5, an almost dense or a completely dense $TiO_2$ thin film was formed on the surface of the substrate that had been soaked for 6 days with 1 equivalent or 2 equivalents of orthoboric acid added. Either of the $TiO_2$ thin film thus obtained was amorphous.

Example 7

0.231 g of $(NH_4)_2TiF_6$ was added to 400 ml of purified water, and was dissolved under stirring at 30° C. for 24 hours to obtain an aqueous solution of $(NH_4)_2TiF_6$ with a concentration of $2.918 \times 10^{-3}$ mol/L. Each 30 ml portion of this solution was taken in three polystyrene containers. In each container was added as a substrate a glass plate that had been previously subjected to ultrasonic washing in ethanol. And an orthoboric acid aqueous solution with a concentration of 0.25 mol/L was added in amounts of 0.42 ml (0.8 equivalent) to the one, 0.53 ml (1 equivalent) to the another one and 1.05 ml (2 equivalents) to the rest one, respectively, and the containers were then maintained at 30° C. for 6 days.

The substrates were taken out from the solution, washed with distilled water and air dried. When each substrate was observed by SEM, formation of a dense thin film was observed. As the result of an XRD measurement, XRD peaks corresponding to those of the anatase structure $TiO_2$ powder was observed for each substrate. Thereby it was confirmed that a thin film containing the anatase structure $TiO_2$ crystals was formed. The peak intensity was greater for the film on the substrate soaked in the solution to which a greater amount of orthoboric acid was added.

Example 8

A thin film of the anatase structure $TiO_2$ crystal with a thickness of 0.4 μm was formed on the inside of the glass tube with a length of 350 mm and an inner diameter of 1 mm by the processesimilar to Example 1. 12,000 of these tubes were bundled, and on both ends of the bundle were installed circular fluorescent tubes whose shape and size were matched to those of the above bundle of glass tubes to make a reactor for the photocatalytic reaction. From the fluorescent tubes on both ends of the reactor, light was guided into the inside of the glass tubes constituting the reactor.

While the reactor was being illuminated with a light, a raw water having a BOD value of 180 mg/L polluted with organic materials was flown from one end of the reactor at a flow rate of 2.5 L/h. The organic materials in the water which came out from the other end were analyzed and were examined for the presence of odor and microorganisms. The BOD value was found to be 1 mg/L or less, and the analytical results and the results of deodorization and sterilization were sufficient and satisfactory.

Example 9

To 500 ml of purified water was added 1.0 g of $(NH_4)_2TiF_6$, and was dissolved under stirring at 30° C. for 24 hours to obtain an aqueous solution of $(NH_4)_2TiF_6$ with a concentration of $1.01 \times 10^{-2}$ mol/L. To this solution was added 17.5 g of the anatase structure $TiO_2$ powder, which was further stirred. Then, the powder $TiO_2$ was separated by filteration by using a filter paper having pores sized 1 μm and the $TiO_2$ fine particles that passed through the filter paper were used as the seed crystals. This mixture was taken in a polystyrene container. In the container was soaked as a substrate a glass plate (alkali-free glass) that had been previously subjected to ultrasonic washing in ethanol, and then 10 g of boron oxide ($B_2O_3$) was added thereto. The container was then maintained at 34° C. for 5 hours.

The substrate thus obtained was analyzed by the SEM, EDX and XRD in the similar manner as in Example 4, and as the results, it was confirmed that a transparent anatase structure $TiO_2$ thin film was formed.

Example 10

To 350 ml of purified water was added 1.5 g of $(NH_4)_2TiF_6$, and was dissolved under stirring at 30° C. for 24 hours to obtain an aqueous solution of $(NH_4)_2TiF_6$ with a concentration of $2.17 \times 10^{-2}$ mol/L. To this solution was added 17.5 g of the anatase structure $TiO_2$ powder and was further stirred. Then, the powder $TiO_2$ was separated by filtration by using a filter paper having pores sized 1 μm and the $TiO_2$ fine particles that passed through the filter paper were used as the seed crystals. This mixture was taken in a polystyrene container. In the container was soaked as a substrate a glass plate (alkali-free glass) that had been previously subjected to ultrasonic washing in ethanol, and then each 5 g of boron oxide ($B_2O_3$) was added for 4 times in an interval of 30 minutes. The container was then maintained at 35° C. for 5 hours.

The substrate thus obtained was analyzed by the SEM, EDX and XRD in the similar manner as in Example 4, and as the results, it could be confirmed that a transparent anatase structure $TiO_2$ thin film was formed.

Example 11

To 350 ml of purified water was added 2.0 g of $(NH_4)_2TiF_6$, and was dissolved under stirring at 30° C. for 24 hours to obtain an aqueous solution of $(NH_4)_2TiF_6$ with a concentration of $2.89 \times 10^{-2}$ mol/L. While 17.5 g of the anatase structure $TiO_2$ powder was added to 400 ml of purified water and was stirred, then, allowed to stand for 2 days. 2 ml of the supernatant (top layer of the mixture) was added to the above aqueous solution to supply seed crystals. This mixture was taken in a polystyrene container. In the container was soaked as a substrate a glass plate (alkali-free glass) that had been previously subjected to ultrasonic washing in ethanol, and then 10 g of boron oxide ($B_2O_3$) was added thereto, and the container was then maintained at 35° C. for 5 hours.

The substrate thus obtained was analyzed by the SEM, EDX and XRD in the similar manner as in Example 4, and as the results, it could be confirmed that a transparent anatase structure $TiO_2$ thin film was formed.

Example 12

To 350 ml of purified water was added 2.5 g of $(NH_4)_2TiF_6$, and was dissolved under stirring at 30° C. for 24 hours to obtain an aqueous solution of $(NH_4)_2TiF_6$ with a concentration of $3.61 \times 10^{-2}$ mol/L. To this solution was added 17.5 g of the anatase structure $TiO_2$ powder and was stirred. Then, the powder $TiO_2$ was separated by filtration by using a filter paper having pores sized 1 μm and the $TiO_2$ fine particles passed through the filter paper were used as the seed crystals. This mixture was taken in a polystyrene container. In the container was soaked as a substrate a glass plate (soda lime glass) that had been previously subjected to ultrasonic washing in ethanol, and then 10 g of boron oxide ($B_2O_3$) was added thereto. The container was then maintained at 40° C. for 7 hours.

The substrate thus obtained was analyzed by the SEM, EDX and XRD in the similar manner as in Example 4, and as the results, it could be confirmed that a transparent anatase structure $TiO_2$ thin film was formed.

Comparative Example 1

To 350 ml of purified water was added 6.3 g of $(NH_4)_2TiF_6$, and was dissolved under stirring at 30° C. for 24 hours to obtain an aqueous solution of $(NH_4)_2TiF_6$ with a concentration of $9.10 \times 10^{-2}$ mol/L. To this solution was added 17.5 g of the anatase structure $TiO_2$ powder and was stirred. Then, the powder $TiO_2$ was separated by filtration by using a filter paper having pores sized 1 μm and the $TiO_2$ fine particles that passed through the filter paper were used as the seed crystals. This mixture was taken in a polystyrene container. In the container was soaked as a substrate a glass plate (alkali-free glass) that had been previously subjected to ultrasonic washing in ethanol, and 10 g of boron oxide ($B_2O_3$) was added. The container was then maintained at 35° C. for 5 hours.

The substrate thus obtained was analyzed by the SEM, EDX and XRD in the similar manner as in Example 4, and as the results, it could be confirmed that a turbid anatase structure $TiO_2$ thin film was formed.

Example 13

In the similar process as described in the above-mentioned Example 11, a titanium oxide film was formed on the both surfaces of a soda lime glass with 50 mm×70 mm×1 mm in size. Each film thickness was about 0.25 μm.

Figure 2:
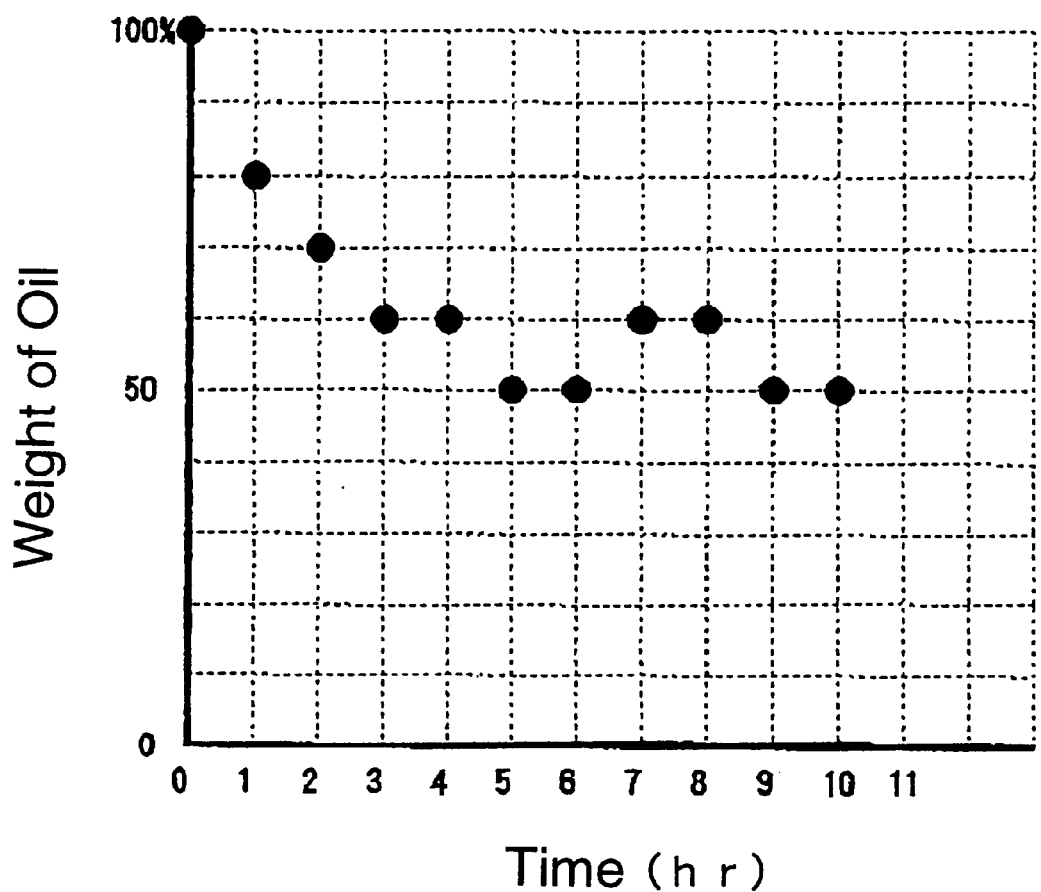
FIG. 2 is a drawing showing a photocatalytic reaction of the titanium oxide film formed on the surface of the soda lime glass obtained in Example 13 against an oil.

To the surface of the titanium oxide film was coated 1 mg of a salad oil with a ratio of 0.03 mg/cm², and an ultraviolet ray was irradiated by a 10 W black light, then, the results as shown in FIG. 2 were obtained.

As shown in FIG. 2, the salad oil showed remarkable weight decrease so that it could be confirmed that the titanium oxide film of the present invention decomposes the salad oil by the photocatalytic reaction.

We claim:

1. A process for producing a titanium oxide film containing crystalline titanium oxide, which comprises forming the titanium oxide film on the surface of a substrate in an aqueous solution containing at least one titanium fluoro complex compound represented by the formula (I):

wherein a plural number of A are the same or different from each other and each A represents a hydrogen atom, an alkali metal atom, an ammonium group or coordinated water; and a, b and c are each a number such that said complex compound is electrically neutral, and a seed crystal for producing the titanium oxide film, in the presence of a fluoride ion-capturing agent to form a titanium oxide film on the surface of the substrate.

2. The producing process according to claim 1, wherein a part or whole portion of the titanium fluoro complex compound is obtained by reacting titanium oxide with hydrofluoric acid.

3. The producing process according to claim 1, wherein A is selected from the group consisting of a hydrogen atom; lithium, sodium, potassium, rubidium, cesium; an ammonium group and coordinated water.

4. The producing process according to claim 1, wherein the compound represented by the formula (I) is

wherein A is as defined in claim 1.

5. The producing process according to claim 1, wherein the compound represented by the formula (I) is at least one compound selected from the group consisting of $H_2TiF_6$, $(NH_4)_2TiF_6$, $Na_2TiF_6$, $K_2TiF_6$, $Rb_2TiF_6$ and $Cs_2TiF_6$.

6. The producing process according to claim 1, wherein the titanium fluoro complex compound is contained in an amount of $10^{-9}$ to $9 \times 10^{-2}$ mol/L.

7. The producing process according to claim 1, wherein the titanium fluoro complex compound is contained in an amount of $10^{-6}$ to $6 \times 10^{-2}$ mol/L.

8. The producing process according to claim 1, wherein the titanium fluoro complex compound is contained in an amount of $10^{-2}$ to $4 \times 10^{-2}$ mol/L.

9. The producing process according to claim 1, wherein the fluoride ion-capturing agent is a homogeneous structure fluoride ion-capturing agent or a heterogeneous structure fluoride ion-capturing agent.

10. The producing process according to claim 9, wherein the homogeneous structure fluoride ion-capturing agent is selected from the group consisting of a boron compound, aluminum chloride, sodium hydroxide and aqueous ammonia.

11. The producing process according to claim 10, wherein the boron compound is at least one compound selected from the group consisting of orthoboric acid, metaboric acid and boron oxide.

12. The producing process according to claim 10, wherein the homogeneous structure fluoride ion-capturing agent is added in an amount of $10^{-4}$ to 3,000% based on an amount corresponding to an equivalent amount of fluoride ions in the solution.

13. The producing process according to claim 1, wherein the seed crystal for producing the film is a seed crystal of titanium oxide.

14. The producing process according to claim 13, wherein the seed crystal is a crystal of an anatase structure titanium oxide or a rutile structure titanium oxide.

15. The producing process according to claim 13, wherein the seed crystal for producing the titanium oxide has an average particle size of 0.001 to 10 μm.

16. The producing process according to claim 14, wherein the seed crystal for producing the titanium oxide has an average particle size of 0.001 to 10 μm.

17. A process for preparing a photocatalyst comprising forming a titanium oxide film on the surface of a substrate by the producing process according to claim 1.

18. The process for preparing a photocatalyst according to claim 17, wherein the titanium oxide has an anatase structure.

19. A process for producing a titanium oxide film having a photocatalytic activity, which comprises forming the titanium oxide film on the surface of a substrate in an aqueous solution containing at least one titanium fluoro complex compound represented by the formula (I):

$$A_a Ti_b F_c \quad (I)$$

wherein a plural number of A are the same or different from each other and each A represents a hydrogen atom, an alkali metal atom, an ammonium group or coordinated water; and a, b and c are each a number such that said complex compound is electrically neutral, and a seed crystal for producing the titanium oxide film in the presence of a fluoride ion-capturing agent to form a titanium oxide film on the surface of the substrate.

20. The producing process according to claim 19, wherein a part or whole portion of the titanium fluoro complex compound is obtained by reacting titanium oxide with hydrofluoric acid.

21. The producing process according to claim 19, wherein A is selected from the group consisting of a hydrogen atom; lithium, sodium, potassium, rubidium, cesium; an ammonium group and coordinated water.

22. The producing process according to claim 19, wherein the compound represented by the formula (I) is $A_2TiF_6$, wherein A is as defined in claim 19.

23. The producing process according to claim 19, wherein the compound represented by the formula (I) is at least one compound selected from the group consisting of $H_2TiF_6$, $(NH_4)_2TiF_6$, $Na_2TiF_6$, $K_2TiF_6$, $Rb_2TiF_6$ and $Cs_2TiF_6$.

24. The producing process according to claim 19, wherein the titanium fluoro complex compound is contained in an amount of $10^{-9}$ to $9 \times 10^{-2}$ mol/L.

25. The producing process according to claim 19, wherein the titanium fluoro complex compound is contained in an amount of $10^{-6}$ to $6 \times 10^{-2}$ mol/L.

26. The producing process according to claim 19, wherein the titanium fluoro complex compound is contained in an amount of $10^{-2}$ to $4 \times 10^{-2}$ mol/L.

27. The producing process according to claim 19, wherein the fluoride ion-capturing agent is a homogeneous structure fluoride ion-capturing agent or a heterogeneous structure fluoride ion-capturing agent.

28. The producing process according to claim 27, wherein the homogeneous structure fluoride ion-capturing agent is selected from the group consisting of a boron compound, aluminum chloride, sodium hydroxide and aqueous ammonia.

29. The producing process according to claim 28, wherein the boron compound is at least one compound selected from the group consisting of orthoboric acid, metaboric acid and boron oxide.

30. The producing process according to claim 28, wherein the homogeneous structure fluoride ion-capturing agent is added in an amount of $10^{-4}$ to 3,000% based on an amount corresponding to an equivalent amount of fluoride ions in the solution.

31. The producing process according to claim 19, wherein the seed crystal for producing the film is a seed crystal of titanium oxide.

32. The producing process according to claim 31, wherein the seed crystal is a crystal of an anatase structure titanium oxide or a rutile structure titanium oxide.

33. The producing process according to claim 31, wherein the seed crystal for producing the titanium oxide has an average particle size of 0.001 to 10 μm.

34. The producing process according to claim 32, wherein the seed crystal for producing the titanium oxide has an average particle size of 0.001 to 10 μm.

35. A process for preparing a photocatalyst comprising forming a titanium oxide film on the surface of a substrate by the producing process according to claim 19.

36. The process for preparing a photocatalyst according to claim 35, wherein the titanium oxide has an anatase structure.

37. A process for producing a titanium oxide film containing crystalline titanium oxide, which comprises forming the titanium oxide film on the surface of a substrate in an aqueous solution containing a titanium fluoro complex ion of the formula: $TiF_6^{2-}$, by adding a fluoride ion-capturing agent to said aqueous solution, wherein said aqueous solution further contains a seed crystal for producing the titanium oxide film.

38. The producing process according to claim 37, wherein a part or whole portion of the titanium fluoro complex ion is obtained by reacting titanium oxide with hydrofluoric acid.

39. The producing process according to claim 37, wherein the titanium fluoro complex ion is obtained by dissolving a titanium fluoro complex compound represented by the formula (I'):

$$A_2TiF_6 \quad (I')$$

wherein a plural number of A are the same or different from each other and each A represents a hydrogen atom, an alkaline metal atom, an ammonium group or coordinated water.

40. The producing process according to claim 39, wherein the compound represented by the formula (I') is at least one compound selected from the group consisting of $H_2TiF_6$, $(NH_4)_2TiF_6$, $Na_2TiF_6$, $K_2TiF_6$, $Rb_2TiF_6$ and $Cs_2TiF_6$.

41. The producing process according to claim 39, wherein the titanium fluoro complex compound is contained in an amount of $10^{-9}$ to $9 \times 10^{-2}$ mol/L.

42. The producing process according to claim 39, wherein the titanium fluoro complex compound is contained in an amount of $10^{-6}$ to $6 \times 10^{-2}$ mol/L.

43. The producing process according to claim 39, wherein the titanium fluoro complex compound is contained in an amount of $10^{-2}$ to $4 \times 10^{-2}$ mol/L.

44. The producing process according to claim 37, wherein the fluoride ion-capturing agent is a homogeneous structure fluoride ion-capturing agent or a heterogeneous structure fluoride ion-capturing agent.

45. The producing process according to claim 44, wherein the homogeneous structure fluoride ion-capturing agent is selected from the group consisting of a boron compound, aluminum chloride, sodium hydroxide and aqueous ammonia.

46. The producing process according to claim 45, wherein the boron compound is at least one compound selected from the group consisting of orthoboric acid, metaboric acid and boron oxide.

47. The producing process according to claim 45, wherein the homogeneous structure fluoride ion-capturing agent is added in an amount of $10^{-4}$ to 3,000% based on an amount corresponding to an equivalent amount of fluoride ions in the solution.

48. The producing process according to claim 37, wherein the seed crystal for producing the film is a seed crystal of titanium oxide.

49. The producing process according to claim 48, wherein the seed crystal is a crystal of an anatase structure titanium oxide or a rutile structure titanium oxide.

50. The producing process according to claim 48, wherein the seed crystal for producing the titanium oxide has an average particle size of 0.001 to 10 μm.

51. The producing process according to claim 49, wherein the seed crystal for producing the titanium oxide has an average particle size of 0.001 to 10 μm.

52. A process for preparing a photocatalyst comprising forming a titanium oxide film on the surface of a substrate by the producing process according to claim 37.

53. The process for preparing a photocatalyst according to claim 52, wherein the titanium oxide has an anatase structure.

54. A process for producing a titanium oxide film having a photocatalytic activity, which comprises forming the titanium oxide film on the surface of a substrate in an aqueous solution containing a titanium fluoro complex ion of the formula: $TiF_6^{2-}$, by adding a fluoride ion-capturing agent to said aqueous solution, wherein said aqueous solution further contains a seed crystal for producing the titanium oxide film.

55. The producing process according to claim 54, wherein a part or whole portion of the titanium fluoro complex ion is obtained by reacting titanium oxide with hydrofluoric acid.

56. The producing process according to claim 54, wherein the titanium fluoro complex ion is obtained by dissolving a titanium fluoro complex compound represented by the formula (I'):

$$A_2TiF_6 \qquad \qquad \text{I(')}$$

wherein a plural number of A are the same or different from each other and each A represents a hydrogen atom, an alkaline metal atom, an ammonium group or coordinated water.

57. The producing process according to claim 56, wherein the compound represented by the formula (I') is at least one compound selected from the group consisting of $H_2TiF_6$, $(NH_4)_2TiF_6$, $Na_2TiF_6$, $K_2TiF_6$, $Rb_2TiF_6$ and $Cs_2TiF_6$.

58. The producing process according to claim 56, wherein the titanium fluoro complex compound is contained in an amount of $10^{-9}$ to $9 \times 10^{-2}$ mol/L.

59. The producing process according to claim 56, wherein the titanium fluoro complex compound is contained in an amount of $10^{-6}$ to $6 \times 10^{-2}$ mol/L.

60. The producing process according to claim 56, wherein the titanium fluoro complex compound is contained in an amount of $10^{-2}$ to $4 \times 10^{-2}$ mol/L.

61. The producing process according to claim 54, wherein the fluoride ion-capturing agent is a homogeneous structure fluoride ion-capturing agent or a heterogeneous structure fluoride ion-capturing agent.

62. The producing process according to claim 61, wherein the homogeneous structure fluoride ion-capturing agent is selected from the group consisting of a boron compound, aluminum chloride, sodium hydroxide and aqueous ammonia.

63. The producing process according to claim 62, wherein the boron compound is at least one compound selected from the group consisting of orthoboric acid, metaboric acid and boron oxide.

64. The producing process according to claim 62, wherein the homogeneous structure fluoride ion-capturing agent is added in an amount of $10^{-4}$ to 3,000% based on an amount corresponding to an equivalent amount of fluoride ions in the solution.

65. The producing process according to claim 54, wherein the seed crystal for producing the film is a seed crystal of titanium oxide.

66. The producing process according to claim 65, wherein the seed crystal is a crystal of an anatase structure titanium oxide or a rutile structure titanium oxide.

67. The producing process according to claim 65, wherein the seed crystal for producing the titanium oxide has an average particle size of 0.001 to 10 μm.

68. The producing process according to claim 66, wherein the seed crystal for producing the titanium oxide has an average particle size of 0.001 to 10 μm.

69. A process for preparing a photocatalyst comprising forming a titanium oxide film on the surface of a substrate by the producing process according to claim 54.

70. The process for preparing a photocatalyst according to claim 69, wherein the titanium oxide has an anatase structure.

* * * * *